United States Patent [19]

Ohkita et al.

[11] Patent Number: 4,882,101
[45] Date of Patent: Nov. 21, 1989

[54] METHOD OF PRODUCING A REINFORCED RUBBER HOSE BY USING A PLASTIC MANDREL

[75] Inventors: Katsuhiko Ohkita; Kazuhiro Ogata; Ken Niwa, all of Komaki, Japan

[73] Assignee: Tokai Rubber Industries, Ltd., Aichi, Japan

[21] Appl. No.: 199,147

[22] Filed: May 26, 1988

[30] Foreign Application Priority Data

May 29, 1987 [JP] Japan .................................. 62-134364

[51] Int. Cl.⁴ .............................................. B29C 33/44
[52] U.S. Cl. ........................................ 264/26; 264/37; 264/103; 264/149; 264/166; 264/173; 264/236; 264/317; 264/347; 425/215
[58] Field of Search ................... 264/37, 25, 165, 166, 264/173, 317, 103, 149, 236, 347, 26; 425/174.4, 215

[56] References Cited

U.S. PATENT DOCUMENTS

| | | | |
|---|---|---|---|
| 3,255,284 | 6/1966 | Meislohn | 264/317 |
| 3,690,796 | 9/1972 | Borsvold | 264/166 |
| 3,972,757 | 8/1976 | Derderian et al. | 264/347 |
| 4,019,939 | 4/1977 | Barbier et al. | 264/317 |
| 4,112,031 | 9/1978 | Gohlisch | 264/347 |
| 4,242,296 | 12/1980 | Bricker | 264/166 |
| 4,415,518 | 11/1983 | Pochurek et al. | 264/166 |
| 4,444,700 | 4/1984 | Fondren | 264/103 |
| 4,702,867 | 10/1987 | Sejimo et al. | 264/347 |

*Primary Examiner*—Jeffery Thurlow
*Attorney, Agent, or Firm*—Oliff & Berridge

[57] ABSTRACT

A method of producing a reinforced rubber hose, including the steps of continuously extruding a long plastic mandrel from a plastic material and feeding the extruded plastic mandrel, extruding an unvulcanized inner rubber tube on the long plastic mandrel, forming a tubular reinforcing layer on the unvulcanized inner rubber tube, extruding an unvulcanized outer rubber tube on the tubular reinforcing layer, vulcanizing the unvulcanized rubber tubes, thereby preparing a long rubber hose formed on the long plastic mandrel, cutting the long rubber hose into short rubber hoses having a predetermined length, while concurrently cutting the long plastic mandrel into short plastic mandrels, removing the short plastic mandrels from the short rubber hoses, and crushing the short plastic mandrels into a starting form of the plastic material, and returning the starting form of the plastic material to an extruder for continuously extruding the long plastic mandrel.

9 Claims, 1 Drawing Sheet

METHOD OF PRODUCING A REINFORCED RUBBER HOSE BY USING A PLASTIC MANDREL

BACKGROUND OF THE INVENTION

1. Field of the Invention

The present invention relates generally to a method of producing a reinforced rubber hose, and more particularly to a method suitable for producing a relatively short reinforced rubber hose with an optimum strength, by utilizing a plastic mandrel.

2. Discussion of the Prior Art

According to a known method, relatively short reinforced rubber hoses such as fuel hoses and Freon hoses for motor vehicles are produced usually in the manner described below.

Initially, a relatively long rubber or plastic mandrel reinforced by a core and having a length of about 100-130 m is prepared. On the outer surface of this long mandrel, there is extruded an unvulcanized inner rubber tube. A tubular reinforcing layer such as a fiber layer is formed on the outer surface of the inner rubber tube, and an unvulcanized outer rubber tube is extruded on the outer surface of the tubular reinforcing layer. Then, the unvulcanized inner and outer rubber tubes on the long mandrel are vulcanized in a known manner, whereby a long rubber hose is formed on the long mandrel. The long mandrel is removed from the prepared long rubber hose, by utilizing a hydraulic pressure, and the long rubber hose is cut into short rubber hoses having a desired length (usually, 100-300 mm).

On the other hand, the removed long mandrel is returned to the first step for extruding the unvulcanized inner rubber tube thereon, so that each portion or length of the mandrel is used repeatedly.

In the prior method described above wherein the long mandrel is reclaimed as it is, the prepared long rubber hose is subjected to an excessively high hydraulic pressure generated by a suitable hydraulic device, in order to remove the long mandrel from the long rubber hose. To withstand such a high hydraulic pressure, the rubber hose is reinforced to a larger extent than practically required. For instance, a Freon hose reinforced by a polyester layer and having an outside diameter of 24 mm has a nominal operating pressure of 30 kg/cm$^2$, and is designed to withstand up to 180 kg/cm$^2$. However, this Freon hose should be reinforced so as to withstand a hydraulic pressure of 230 kg/cm$^2$ applied upon removal of the mandrel from the hose. Thus, the hose should be reinforced more than required in practical use.

Further, the long mandrel repeatedly used as it is tends to be expanded due to heat during vulcanization of the unvulcanized rubber tubes, whereby the outside diameter of the long mandrel is likely to increase. Also, the mandrel tends to be damaged during the repeated use. Hence, the long mandrel should be regularly checked for an undesirable increase in its outside diameter and its surface condition, in order to prevent a variation of the inside diameter of the produced rubber hose from the nominal value. Moreover, the conventional method requires a space for storing long mandrels for replacing the consumed mandrel.

SUMMARY OF THE INVENTION

It is therefore an object of the present invention to provide a method by which an optimally reinforced rubber hose can be economically and accurately produced, such that a mandrel is readily removed from the prepared rubber hose, without using a hydraulic device.

The above object can be accomplished according to the principle of the present invention, which provides a method of producing a reinforced rubber hose by using a plastic mandrel, comprising the steps of: (a) continuously extruding a long plastic mandrel from a plastic material and feeding the extruded plastic mandrel; (b) extruding an unvulcanized inner rubber tube on an outer surface of the long plastic mandrel; (c) forming a tubular reinforcing layer on an outer surface of the unvulcanized inner rubber tube; (d) extruding an unvulcanized outer rubber tube on an outer surface of the tubular reinforcing layer; (e) vulcanizing the unvulcanized inner and outer rubber tubes, thereby preparing a long rubber hose formed on the long plastic mandrel; (f) cutting the prepared long rubber hose into short rubber hoses having a predetermined length, and concurrently cutting the long plastic mandrel into short plastic mandrels having the predetermined length; (g) removing the short plastic mandrels from the respective short rubber hoses; and (h) crushing the removed short plastic mandrels into a starting form of the plastic material, and returning the starting form of the plastic material to an extruder for continuously extruding the long plastic mandrel, so that the short plastic mandrels are reclaimed as the plastic material.

In the method of the present invention described above, the long plastic mandrel is formed by extrusion and is fed at a rate equal to a predetermined speed of a production line by which the instant method is practiced. The long plastic mandrel is not recirculated and reclaimed. Namely, the long plastic mandrel is cut into short plastic mandrels of about 100-300 mm, for example, together with the prepared long rubber hose, after the unvulcanized rubber tubes are vulcanized. Since the obtained short plastic mandrels are sufficiently short, the short mandrels may be easily removed by hand from the respective short rubber hoses, without a hydraulic device as conventionally used. Accordingly, the rubber hoses need not be excessively reinforced, as required in the conventional method which utilizes a hydraulic device to remove the mandrel from the prepared rubber hose. The instant method makes it possible to produce a rubber hose which is reinforced to a suitable extent that provides a practically required nominal strength. This results in a reduced cost of manufacture of the hose.

The short rubber hoses from which the short plastic mandrels have been pulled out may be used as automotive rubber hoses, while the removed short plastic mandrels are crushed into pieces, which are fed back to the extruder for continuously extruding the long plastic mandrel, so that the pieces are reclaimed as the plastic material, to produce a new length of the long plastic mandrel. Generally, the plastic material formed into the long plastic mandrel can be reclaimed at least twenty times. Therefore, it is not necessary to keep extra mandrels in store. Further, since the long plastic mandrel is used only once and is reclaimed to produce a new supply, the long plastic mandrel used always has a predetermined constant outside diameter and is free from damages due to repeated use. Thus, the instant method requires a reduced amount of the plastic material and a reduced space for the mandrel, and assures economical, efficient and precise manufacture of the reinforced rubber hoses.

The plastic material of the long plastic mandrel to be extruded may consist of polymethyl pentene, polyester, nylon and similar materials which can be continuously extruded and reclaimed by crushing. However, polymethyl pentene is most preferred, since it has high flexibility and is not softened at a vulcanizing temperature (usually, 150°-190° C.) used in the method. For example, polymethyl pentene is available from Mitsui Sekiyu Kagaku Kogyo Kabushiki Kaisha, as "TPX" which has a melting point of 247° C. The extruded long mandrel may be extruded and fed at a rate of 10–15 m/min.

For example, the starting form of the plastic material consists of a batch of fragments produced by crushing of the short plastic mandrels removed from the short rubber hoses. Since the short plastic mandrels are crushed to be reclaimed as the plastic material, the long plastic mandrel cannot include a reinforcing core such as a metal wire.

The instant method may further comprise microwave-heating the unvulcanized inner and outer rubber tubes to soften the rubber tubes, before the unvulcanized rubber tubes are vulcanized. In this case, the method may further comprise extruding a plastic cover tube of a resin on an outer surface of the unvulcanized outer rubber tube, and cooling the plastic cover tube before the unvulcanized inner and outer rubber tubes are microwave-heated.

The extrusion of the unvulcanized inner and outer rubber tubes and the formation of the tubular reinforcing layer on the long plastic mandrel, and the vulcanization of the unvulcanized rubber tubes, may be effected in an ordinary manner.

According to a further form of the invention, the instant method may further comprise a step of winding as a roll a predetermined length of a prepared intermediate product which consists of the long plastic mandrel, the unvulcanized inner and outer tubes and the tubular reinforcing layer, and a step of introducing the roll into a vulcanizing device, to vulcanize the unvulcanized inner and outer rubber tubes of the intermediate product, to thereby prepare the above-indicated long rubber hose, before the prepared long rubber hose is cut into the short rubber hoses. In this case, a lead covering layer may be formed on an outer surface of the unvulcanized outer rubber tube of the intermediate product, before introducing the roll into the vulcanizing device. The lead covering layer is removed before the long rubber hose is cut into the short rubber hoses.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
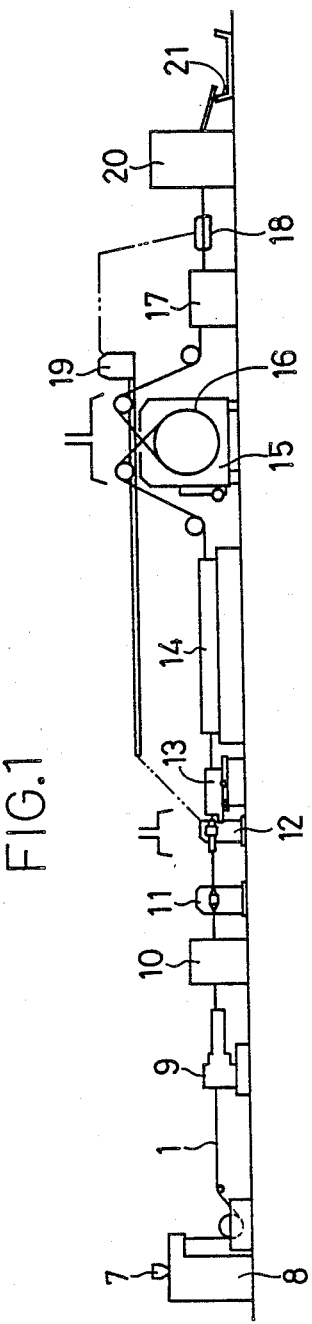
FIG. 1 is a schematic side elevational view of a production line suitable for practicing the presently preferred embodiment of the method of this invention.

Referring to FIG. 1, the production line for practicing the presently preferred method of the invention includes a mandrel extruder 8 equipped with a hopper 7 adapted to receive crushed fragments of polymethyl pentene, which is used as a plastic material supplied to the mandrel extruder 8. The mandrel extruder 8 is adapted to continuously extrude a long plastic mandrel 1 of polymethyl pentene which has an outside diameter of 7.2 mm±0.05 mm. The extruded long plastic mandrel 1 was delivered and fed from the extruder 8 at a rate of 10–15 m/min., which is an operating speed of the production line.

Figure 2:
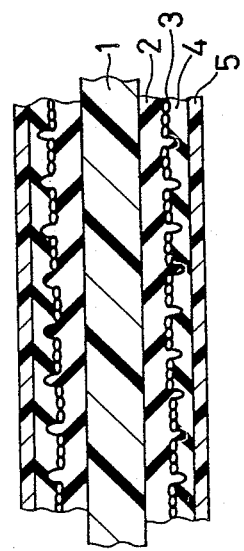
FIG. 2 is a fragmentary elevational view in longitudinal cross section of a portion of a reinforced rubber hose produced according to the method practiced in the production line of FIG. 1.

Referring further to FIG. 2, after the plastic mandrel 1 was cooled down to about 50° C., an unvulcanized inner rubber tube 2 was continuously extruded by a first rubber extruder 9, on the outer surface of the plastic mandrel 1. Then, a tubular reinforcing fiber layer 3 was formed by a braider 10, on the outer surface of the unvulcanized inner rubber tube 2, and an unvulcanized outer rubber tube 4 was continuously extruded at 90° C. by a second rubber extruder 11, on the outer surface of the tubular reinforcing fiber layer 3. Subsequently, a plastic cover tube 5 of polymethyl pentene having a melting point of 247° C. was continuously extruded at 270° C. by a plastic extruder 12, on the outer surface of the unvulcanized outer rubber tube 4.

Successively, the plastic cover tube 5 covering the unvulcanized rubber material 2, 4 was chilled to about 130° C. by a cooling device 13, in order to maintain the shape of the unvulcanized rubber mass. Then, the unvulcanized inner and outer rubber tubes 2, 4 were internally heated by a microwave-heating device in the form of a UHF (ultra-high frequency) heating device 14. The thus prepared intermediate product was then continuously introduced into a salt bath 15 equipped with a rotating drum 16. The drum 16 is formed with a helical groove in its outer circumferential surface, so that the intermediate product engaging the helical groove is moved from one end of the groove to the other end while the drum 16 is rotating. In this specific example, the intermediate product was externally heated at 160° C. in an ordinary manner, whereby the unvulcanized rubber tubes 2, 4 were vulcanized.

The plastic cover tube 5 was cleaned by a cleaning device 17, and then removed by crushing by a plastic remover 18. The removed resin (polymethyl pentene) was fed to a plastic crusher 19, so that the crushed resin can be reclaimed by the plastic extruder 12. Each length of the prepared long rubber hose formed on the long plastic mandrel 1 which has passed the plastic remover 18 is cut by a hose cutter 20, into short rubber hoses each having a length of 300 mm, together with the plastic mandrel 1. Described more specifically, the long plastic mandrel 1 was also cut into short plastic mandrels having a 300 mm length. The thus obtained short rubber hoses and short plastic mandrels were received in a container 21.

The short plastic mandrels were removed by hand from the respective short rubber hoses. The rubber hoses from which the short plastic mandrels were removed are end products manufactured according to the instant method. On the other hand, the removed short plastic mandrels of polymethyl pentene were crushed by a suitable crusher (not shown), into a batch of cubic fragments each having about 7 mm×7 mm faces. The obtained cubic fragments of polymethyl pentene were returned to the hopper 7 of the mandrel extruder 8. Thus, the cubic fragments produced from each used length or portion of the long plastic mandrel 1 were reclaimed as the starting form of the plastic material supplied to the mandrel extruder 1.

In the illustrated embodiment, a prepared intermediate product which consists of the plastic mandrel 1, unvulcanized inner and outer rubber tubes 2, 4 and reinforcing fiber layer 3 is continuously subjected to the steps carried out by the plastic extruder 12, chilling device 13 and UHF heating device 14, before the thus treated intermediate product is introduced into the salt bath 15. However, it is possible that a predetermined length (for example, 100 m) of the intermediate product obtained from the second rubber extruder 11 may be once wound as an intermediate product roll, and the roll is introduced into a known vulcanizer to vulcanize the unvulcanized inner and outer rubber tubes of the intermediate product, to thereby prepare the long rubber hose of the predetermined length, before the prepared long rubber hose is cut into the short rubber hoses. In this case, a covering layer or sheath of lead may preferably be formed on the outer surface of the unvulcanized outer rubber tube of the intermediate product, by extruding a molten lead on the surface of the intermediate product as it is unwound from the roll. Then, the lead covered intermediate product is rewound again as a roll, before the roll is introduced into the vulcanizer. The lead covering layer is removed before the long rubber hose is cut by the hose cutter 20 into the short rubber hoses, like the plastic cover tube 5 is removed by the plastic remover 18 in the illustrated embodiment.

For vulcanizing the unvulcanized inner and outer rubber tubes, it is possible to employ any known suitable vulcanization techniques such as open steam cures, hot air cures, and a technique using a liquid curing medium, other than the salt bath vulcanization technique using a salt bath, or a vulcanization technique using a lead covering layer, as described above.

While the present invention has been described in its presently preferred embodiments with a certain degree of particularity, it is to be understood that the invention is not limited to the precise details of the illustrated embodiment, but may be embodied with various changes, modifications and improvements, which may occur to those skilled in the art, without departing from the spirit and scope of the invention defined in the following claims.

What is claimed is:

1. A method of producing a reinforced rubber hose by using a plastic mandrel, comprising the steps of:

continuously extruding a long plastic mandrel from a plastic material and feeding the extruded plastic mandrel;

extruding an unvulcanized inner rubber tube on an outer surface of said long plastic mandrel;

forming a tubular reinforcing layer on an outer surface of said unvulcanized inner rubber tube;

extruding an unvulcanized outer rubber tube on an outer surface of said tubular reinforcing layer;

vulcanizing said unvulcanized inner and outer rubber tubes, thereby preparing a long rubber hose formed on said long plastic mandrel;

cutting the prepared long rubber hose into short rubber hoses having a predetermined length, and concurrently cutting said log plastic mandrel into short plastic mandrels having said predetermined length;

removing said short plastic mandrels from the respective short rubber hoses; and crushing the removed short plastic mandrels into a starting form of said plastic material, and returning said starting form of the plastic material to an extruder for continuously extruding said long plastic mandrel, so that said short plastic mandrels are reclaimed as said plastic material.

2. A method according to claim 1, wherein said plastic material consists of polymethyl pentene.

3. A method according to claim 1, wherein said long plastic mandrel is extruded and fed at a rate of 10-15 m/min.

4. A method according to claim 1, wherein said starting form of said plastic material consists of a batch of fragments produced by crushing of said short plastic mandrels.

5. A method according to claim 1, further comprising microwave-heating said unvulcanized inner and outer rubber tubes to soften said rubber tubes, before said unvulcanized rubber tubes ar vulcanized.

6. A method according to claim 5, further comprising extruding a plastic cover tube of a resin on an outer surface of said unvulcanized outer rubber tube, and cooling said plastic cover tube before said unvulcanized inner and outer rubber tubes are microwave-heated.

7. A method according to claim 1, further comprising the steps of: winding as a roll a predetermined length of a prepared intermediate product which consists of said long plastic mandrel, said unvulcanized inner and outer tubes and said tubular reinforcing layer; and introducing said roll into a vulcanizing device, to vulcanize said unvulcanized inner and outer rubber tubes of said intermediate product, to thereby prepare said long rubber hose, before the prepared long rubber hose is cut into said short rubber hoses.

8. A method according to claim 7, further comprising forming a lead covering layer on an outer surface of said unvulcanized outer rubber tube of said intermediate product, before introducing said roll into said vulcanizing device.

9. A method according to claim 1, wherein said predetermined length of said short rubber hoses falls in a range of 100 to 300 mm.

* * * * *